April 23, 1935. A. M. PATTON 1,999,056
STRETCHER CARRYING VEHICLE
Filed Jan. 3, 1934 3 Sheets-Sheet 1

Alexander Marcus Patton, Inventor
per ATTORNEY.

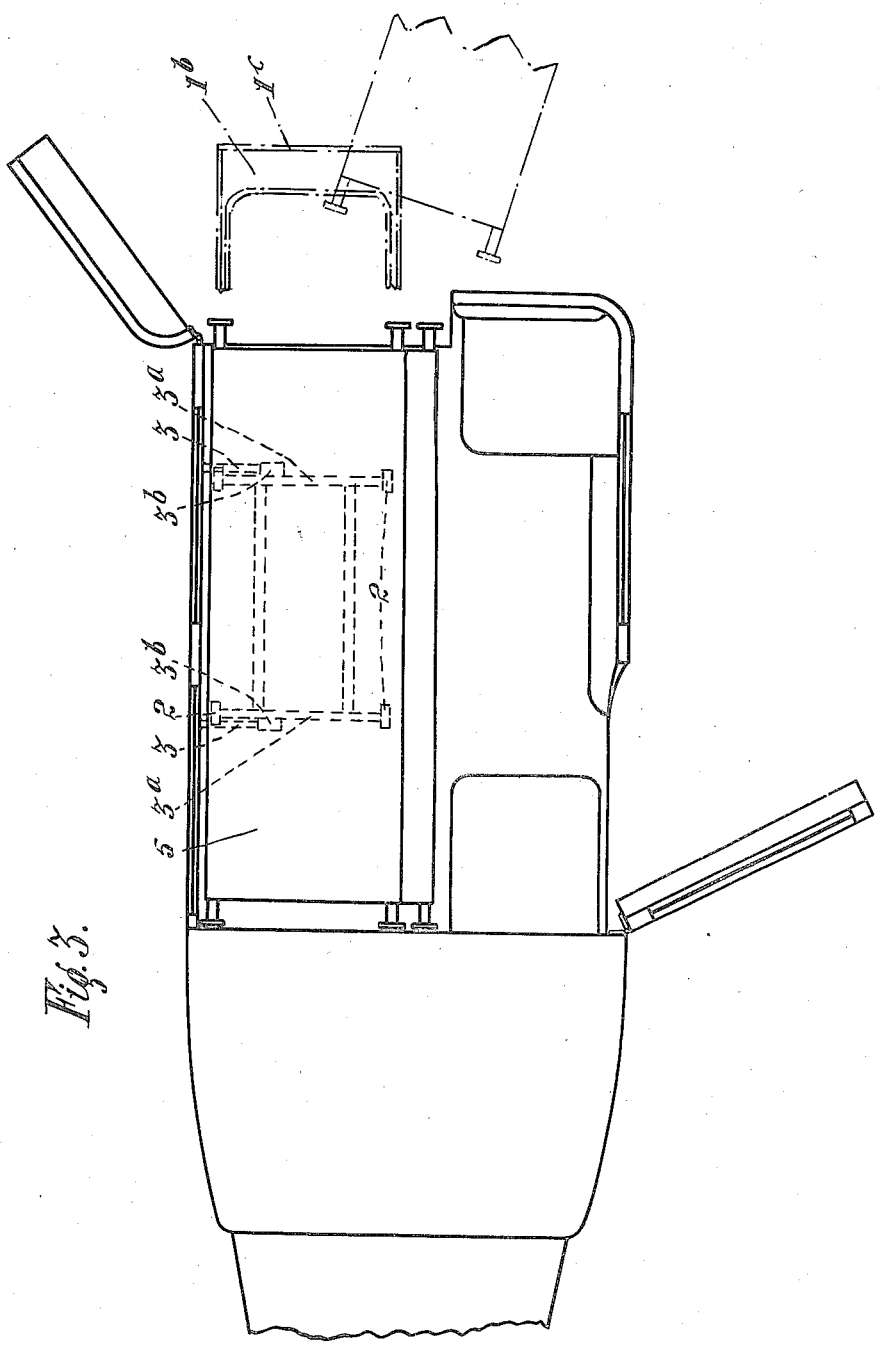

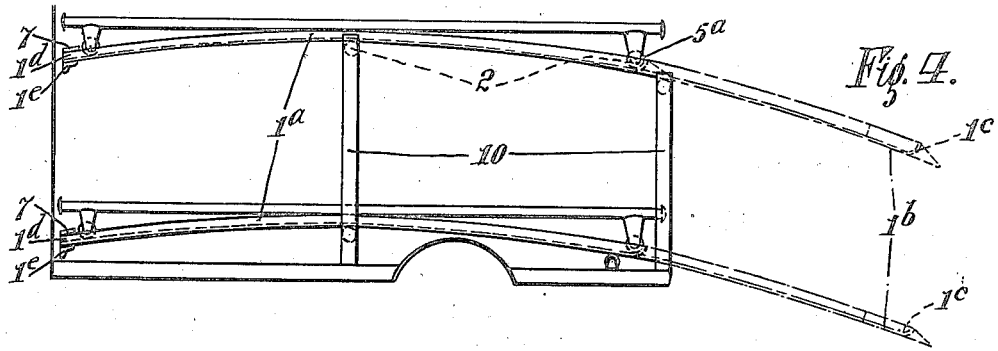
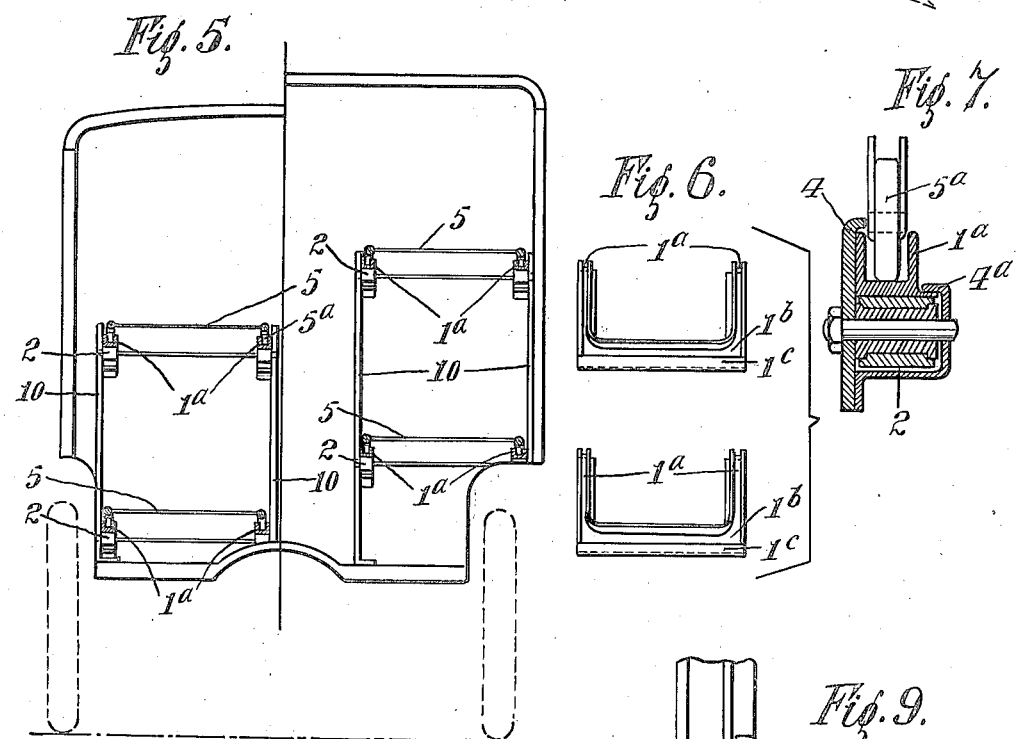
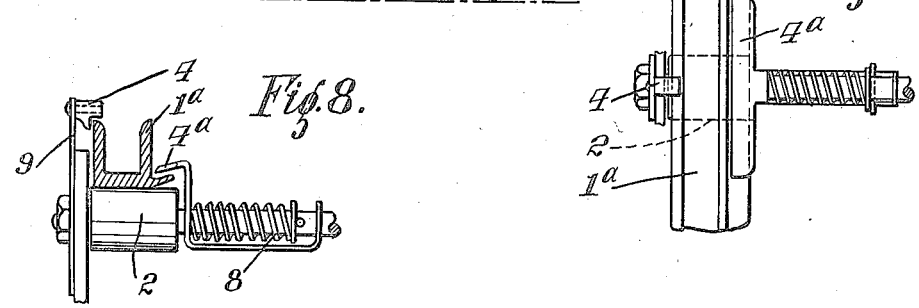

Patented Apr. 23, 1935

1,999,056

UNITED STATES PATENT OFFICE 1,999,056

STRETCHER CARRYING VEHICLE

Alexander Marcus Patton, Belfast,
Northern Ireland

Application January 3, 1934, Serial No. 705,101
In Great Britain January 12, 1933

12 Claims. (Cl. 214—85)

This invention relates to stretcher-carrying vehicles such as ambulances, and has for its object to provide stretcher-supporting means adapted to give a low loading position and obviate the need for lifting the stretcher to an inconvenient height before it can be pushed into the vehicle.

A further object is to provide stretcher-supporting means which is outwardly movable from the normal horizontal, supporting position through a downwardly curved path in order to give a loading position which is substantially lower than the normal supporting position.

A further object is to provide such supporting means comprising one or more loading trays supported on rollers or equivalent, and movable thereon through a curved path giving a low loading position of the tray in its outermost or loading position and a suitable horizontal position of the stretcher when the tray is moved into the vehicle to the normal travelling position.

The tray preferably slides on rollers provided in the interior of the vehicle, means being provided for holding the tray on the rollers but such that the tray can be removed when desired, the tray having channel, or equivalent, side members which form a track and guides for the rollers or wheels on the stretcher.

The invention will now be described, by way of example only, with reference to the accompanying drawings whereon:—

Fig. 3 is a plan view, corresponding to Fig. 1, with the vehicle roof removed.

Fig. 4 is a side elevation showing another arrangement of the stretcher-supporting means.

Fig. 5 shows diagrammatically two half sections of a vehicle (looking from the back) and illustrates two different arrangements of the stretcher-supporting means.

Fig. 6 is a back view showing two of the stretcher-carrying trays or movable members pulled out to the loading position.

Fig. 7 is a detailed sectional elevation of one of the rollers for supporting the stretcher-carrying tray or movable member and also the tray-retaining means.

Fig. 8 is a sectional elevation showing a tray or movable member supporting roller and a modified form of device for retaining the stretcher-carrying tray or movable member on the roller.

Fig. 9 is a plan view corresponding to Fig. 8.

Figure 1:
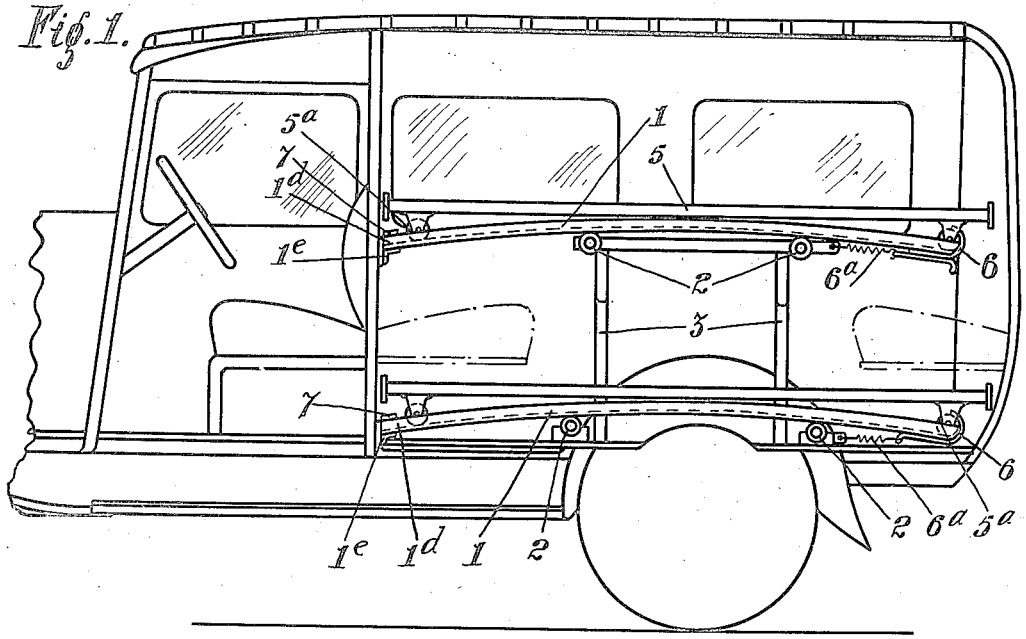
Fig. 1 is a sectional elevation of an ambulance having two stretcher supporting-means in accordance with the invention, arranged one above the other at one side.
Figure 2:
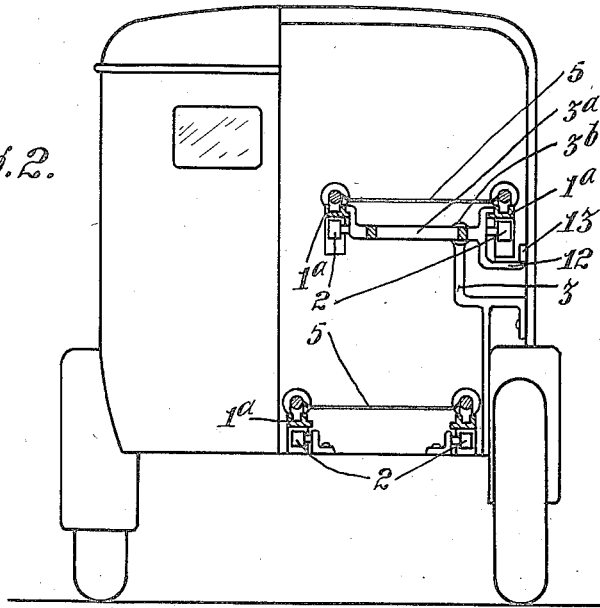
Fig. 2 is an end elevation, partly in section, corresponding to Fig. 1.

In carrying out the invention, according to the example, as shown at Figs. 1 to 3, I provide in a vehicle, two stretcher-carrying trays or movable members 1, each comprising channel shaped side members 1ª, the channel members being curved and sliding on rollers 2 supported in brackets 3 attached to the vehicle, the rollers being rubber covered. The support for the upper stretcher-carrying tray comprises the brackets 3, attached to the side and floor of the ambulance, and cross members 3ª, pivotally mounted on the bracket 3, whereby the upper tray 1, which is supported upon the rollers 2 at the end of said cross members 3ª, can be swung up out of the way, when required, about the pivots 3ᵇ, projections 12 being provided as shown in Fig. 2 for engaging abutments 13 fixed to the side of the vehicle. The tray 1 is slidably or movably held in place on the rollers 2 by means of clips 4 and (or) 4ª as shown in Figs. 7 and 8. In Fig. 8, the clip 4ª is maintained in position by the spring 8 and can readily be retracted to permit removal of the tray 1. The strip 9 upon which the projection 4 is mounted may be of a resilient nature so that this projection may also be retracted. The loading end of the tray 1 is formed as a convenient receiving plate 1ᵇ for the stretcher 5 and for the purpose of providing a stopper for the stretcher rollers 5ª against outward movement the loading end 1ᵇ terminates in an upward curve or flange 1ᶜ. The inner ends 1ᵈ of the channel shaped side members 1ª are provided with stoppers or downward flanges 1ᵉ which co-operate with the innermost tray-carrying rollers 2 to prevent the tray 1 being pulled right out. The innermost tray-carrying rollers 2 may be supported on the curved boxes or covers which cover the wheels on the inside of the vehicle. The stretcher rollers or wheels 5ª run in the channel side members 1ª of the tray, upwardly turned flanged ends or a bar 7 being provided on the channel members 1ª at their innermost ends to provide stops for the stretcher rollers 5ª. The stretcher 5 is held in place on the tray 1 and the tray prevented from sliding out, by means of a hook 6 (see Fig. 1) which can be engaged round the end of the tray and the end of the stretcher, the lower hook being connected to the floor of the vehicle by means of a spring 6ª and the upper hook similarly connected to the bracket 3. If desired the stretchers 5 may have extensible handles.

Figs. 4 and 5 show differently arranged supports or brackets 10 for supporting the rollers 2, the brackets 10 being attached to the sides and/or floor of the ambulance.

To load the vehicle, the tray is pulled out as indicated by the dotted lines in Fig. 4, the curved nature of the tray providing a low loading height. The stretcher is then placed on the tray and pushed along same. As shown at Fig. 3 the stretcher 5 can be very conveniently landed with one wheel on the loading plate 1b and then slid over the plate 1b until the two wheels coincide with and can be run along the channels 1a into position for loading into the vehicle, that is, when the front rollers 5a of the stretcher abut against the stop or bar 7. The tray and stretcher are then pushed back to the normal position in the vehicle, the securing hook 6 being then attached to the tray and the stretcher thereby securing same effectively in position in the vehicle.

In vehicles of the type referred to, the stretcher trays or bearers are sometimes arranged one above the other on one or both sides of the vehicle, the upper trays being supported so that they can be lowered when loading and unloading. This arrangement usually has the disadvantage that the upper trays must be loaded below the lower ones, and the present invention removes this disadvantage by providing means whereby the upper and lower trays can easily be loaded in any desired order and also providing a convenient low loading position of the upper tray or trays.

It will be understood that, where upper and lower stretcher supports are provided, the invention may, if desired, only be applied to the upper support.

I claim:—

1. In a stretcher-carrying vehicle, means for supporting a stretcher, comprising an arched member upon which the stretcher can be placed and support means upon which said member can be slid out in its direction of curvature from its normal horizontal position to an outer low loading position to receive the stretcher and which can be slid back with the stretcher thereon to the inner normal position.

2. In a stretcher-carrying vehicle, means for supporting a stretcher, comprising an arched member upon which the stretcher can be placed and guide means in which said member can be slid out in its direction of curvature from a normal horizontal position to a low loading position for receiving the stretcher and which can be slid back with the stretcher thereon to the inner normal position.

3. In a stretcher-carrying vehicle, means for supporting a stretcher, comprising an arched member with lateral, arched runways for receiving the stretcher, and support means upon which said member can be slid out in its direction of curvature from a normal horizontal position to an outer low loading position at which the stretcher can easily be engaged in said runways and pushed along same.

4. In a stretcher-carrying vehicle, means for holding a stretcher comprising an arched slide member for receiving the stretcher, guide means upon which said member can be slid out in its direction of curvature from a normal horizontal position to a low loading position for receiving the stretcher, and a pivotal mounting for said guide means so that the same and the slide member can be turned out of the way.

5. In a stretcher-carrying vehicle, means for supporting a stretcher comprising a member having upwardly curved runways for receiving the stretcher, stop means for the stretcher at the inner ends of said runways, and a landing plate at the outer ends for the stretcher, and comprising anti-friction support means upon which said member can be slid out in its direction of curvature from a normal horizontal position to an outer, low loading position at which the stretcher can easily be landed upon said plate and pushed along said runways until it engages said stop means, whereafter the member with the stretcher is slid back to the horizontal position.

6. In a stretcher-carrying vehicle, means for supporting a stretcher comprising a member with upwardly curved runways for receiving the stretcher, stop means for the stretcher at the inner ends of said runways, a transverse landing plate at the outer ends of, and connecting the runways, spaced anti-friction supports for said runways attached to the vehicle and removable catch means for retaining said member in its inner position, the member being slidable on its supports from an inner, horizontal position to an outer low loading position in which the inner end of the stretcher can readily be landed on said plate.

7. In a stretcher-carrying vehicle, means for supporting a stretcher comprising a member with upwardly curved runways for receiving the stretcher, stop means for the stretcher at the inner and outer ends of said runways, a transverse landing plate at the outer ends of, and connecting the runways, spaced anti-friction supports for said runways attached to the vehicle and removable catch means for retaining said member in its inner position, the member being slidable on its supports from an inner, horizontal position to an outer low loading position in which the inner end of the stretcher can readily be landed on said plate.

8. In a stretcher-carrying vehicle, means for supporting a stretcher comprising a member with upwardly curved runways for receiving the stretcher, stop means for the stretcher at the inner ends of said runways, a transverse landing plate at the outer ends of, and connecting the runways, spaced anti-friction supports for said runways attached to the vehicle, guide means for holding the runways on said supports, and removable catch means for retaining said member in its inner position, the member being slidable on its supports from an inner, horizontal position to an outer low loading position in which the inner end of the stretcher can readily be landed on said plate.

9. In a stretcher-carrying vehicle, upper and lower means for supporting stretchers, each means comprising a member with upwardly curved runways for receiving the stretcher, stop means for the stretcher at the inner ends of said runways, a transverse landing plate at the outer ends of, and connecting the runways, spaced anti-friction supports for said runways attached to the vehicle, guide means for holding the runways on said supports, removable catch means for retaining said member in its inner position, and a pivotal mounting for the anti-friction support of said upper means, the member being slidable on its supports from an inner, horizontal position to an outer, low loading position in which the inner end of the stretcher can readily be landed on said plate.

10. For use in stretcher-supporting means for ambulances, a low loading device for receiving the stretcher and comprising spaced, curved runways for receiving the stretcher supports, a cross member at the inner ends of said runways for stopping the stretcher, and a transverse landing plate at the outer ends for an end of the stretcher.

11. In a stretcher-carrying vehicle, means for supporting a stretcher comprising, a member with upwardly curved runways of channel cross section for receiving the stretcher supports, stop means for said supports at the inner and outer ends of said runways, a transverse landing plate at the outer ends of, and connecting, the runways, supporting rollers carried inside the vehicle for the runways, spring-urged guide means for retaining said runways upon the rollers and removable catch means for retaining said member in its inner position, the member being movable on its rollers from an inner, horizontal position to an outer, low loading position at which the inner end of the stretcher can readily be landed upon said plate.

12. In a stretcher-carrying vehicle, means for supporting a stretcher comprising a member having upwardly curved runways for receiving the stretcher, stop means for the stretcher at the inner ends of said runways, and a landing plate at the outer ends for the stretcher, and comprising anti-friction support means upon which said member can be slid out in its direction of curvature from a normal horizontal position to an outer, low loading position at which the stretcher can easily be landed upon said plate and pushed along said runways until it engages said stop means, whereafter the member with the stretcher is slid back to the horizontal position, stop means being provided to limit the outward movement of said member.

ALEXANDER MARCUS PATTON.